(12) United States Patent
Lin (10) Patent No.: US 11,249,300 B1
(45) Date of Patent: Feb. 15, 2022

(54) MODULAR ASSEMBLY OF ENDOSCOPE LIGHT SOURCE AND IMAGE-CAPTURING MODULE

(71) Applicant: MEDICAL INTUBATION TECHNOLOGY CORPORATION, Taoyuan (TW)

(72) Inventor: Ming-Yuan Lin, Taoyuan (TW)

(73) Assignee: MEDICAL INTUBATION TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 17/207,013

(22) Filed: Mar. 19, 2021

(30) Foreign Application Priority Data

Sep. 29, 2020 (TW) .................................. 109133884

(51) Int. Cl.
*G02B 23/24* (2006.01)
*H04N 5/225* (2006.01)

(52) U.S. Cl.
CPC ..... *G02B 23/2484* (2013.01); *G02B 23/2461* (2013.01); *H04N 5/2253* (2013.01); *H04N 5/2256* (2013.01); *H04N 2005/2255* (2013.01)

(58) Field of Classification Search
CPC ............ G02B 23/2484; G02B 23/2461; H04N 5/2253; H04N 5/2256; H04N 2005/2255

USPC .......................................................... 348/65
See application file for complete search history.

(56) References Cited

U.S. PATENT DOCUMENTS

| 9,572,482 B2 * | 2/2017 | Lin ...................... A61B 1/0684 |
| 2021/0127953 A1 * | 5/2021 | Oyama .................. G02B 23/24 |

FOREIGN PATENT DOCUMENTS

TW        M601086 U       9/2020

* cited by examiner

*Primary Examiner* — James T Boylan
(74) *Attorney, Agent, or Firm* — Muncy, Geissler, Olds & Lowe, P.C.

(57) ABSTRACT

A modular assembly of an endoscope light source and an image-capturing module includes: a circuit board having a lower plate and an elevation support platform located on the top surface of the lower plate and having a predefined height, a bottom surface of the lower plate having a plurality of bottom electrode sheets disposed thereon, a top end of the elevation support platform having a plurality of light source electrode sheets disposed thereon, the plurality of light source electrode sheets using a plurality of lead wires to penetrate through the elevation support platform and the lower plate in order to be electrically connected to the plurality of bottom electrode sheets; a plurality of light emitting diode chips having a florescent powder gel covered thereon; an image-capturing module; and a fixation glue cured and attached onto the image-capturing module, the elevation support platform and the fluorescent powder gel.

9 Claims, 9 Drawing Sheets

MODULAR ASSEMBLY OF ENDOSCOPE LIGHT SOURCE AND IMAGE-CAPTURING MODULE

BACKGROUND OF THE INVENTION

1. Field of the Invention

The present invention is related to an endoscope, and in particular, to a modular assembly of an endoscope light source and an image-capturing module.

2. Description of the Related Art

Presently, in the field of endoscope, the top end of an endoscope typically uses a metal tube, and the internal of the metal tube is installed with an assembly of an image-capturing module and a light source. After an image sensor (commonly uses a charged-coupled device CCD) is combined with a lens set, an image-capturing module is formed. A light emitting diode (i.e., light source) refers to a finished product formed by combining a light emitting diode chip, fluorescent glue and substrate. Accordingly, in terms of the assembly, the image-imaging module is typically installed onto a circuit board first, and the light emitting diode is then installed onto another circuit board, followed by assembling the two together in order to be eventually installed at the top end of the endoscope inside the metal tube.

To overcome the aforementioned problem, the inventor of the present invention has also previously disclosed another technical solution in Taiwan Patent No. M601086 "Endoscope Camera and Light Source Structure", and the main technical measures of the patent are to dispose an image-capturing module and a light emitting diode chip on a circuit board, and a fluorescent powder gel is used to bind and secure all component parts together in order to form an integral structure, thereby reducing the installation process steps of installation inside the metal tube at the top end of the endoscope, thereby further achieving the effect of miniaturizing the overall structure. However, during the actual use of this technical solution, due to the relative relationship between the light source and the image-capturing module, it can cause the shape (i.e., light shape) of the project area of the light emitted from the light source to generate shadow; in other words, the light shape is poor. Accordingly, the height of the light source needs to be elevated to approach the front end of the image-capturing module, in order to eliminate the shadow and to obtain a better light shape as well as to achieve the effect of increase of brightness. However, it also leads to the question on how to elevate the light source while being connected to the circuit board at the bottom.

U.S. Pat. No. 9,572,482 discloses an endoscope with a flexible circuit board, and its light source adopts the design of approaching the image-capturing module head end. However, it mainly uses a base mounting frame 20 having a U shape as a base for the molding, followed by placing a flexible circuit board 30 onto the base mounting frame in order to for a U-shaped structure. In addition, the image-capturing module is then disposed at the bottom of the U-shaped structure. Such method is able to achieve the effect of allowing the light source to be closer to the image-capturing module; however, it does not include a circuit board disposed at the bottom. Furthermore, the main function of the circuit board at the bottom is to provide a contact point at the bottom surface in order to allow other elements to be electrically connected thereto, such that other elements, such as the endoscope main unit or operating handle, can be electrically connected, thereby achieving the operation or control function. In view of the above, U.S. Pat. No. 9,572,482 does not disclose the technique on how to overcome the aforementioned problem. Furthermore, when a base mounting frame of a flexible circuit board or a rigid circuit board is to be molded consistently for attachment, the problems associated with the prior molding and assembly difficulty also exist.

SUMMARY OF THE INVENTION

A primary objective of the present invention is to provide a modular assembly of an endoscope light source and an image-capturing module. In addition to integrating the circuit board, light source and image-capturing module into one module, it is able to further elevate the light source from the circuit board in order to allow it to be closer to the top end of the image-capturing module while maintaining the electrical connection of the contacts disposed at the bottom portion of circuit board located at the bottom.

According to the aforementioned objective, the present invention provides a modular assembly of an endoscope light source and an image-capturing module, comprising: a circuit board having a lower plate and an elevation support platform; a bottom surface of the lower plate having a plurality of bottom electrode sheets disposed thereon, and a top surface of the lower plate having a main element zone and a platform zone not overlapping with each other; the elevation support platform located on the top surface of the lower plate and within the platform zone and having a predefined height: the top surface of the lower plate having a plurality of top electrode sheets disposed thereon and located within the main element zone: the plurality of top electrode sheets electrically connected to the plurality of bottom electrode sheets; a top end of the elevation support platform having a plurality of light source electrode sheets disposed thereon; the plurality of light source electrode sheets using a plurality of lead wires to penetrate through the elevation support platform and the lower plate in order to be electrically connected to the plurality of bottom electrode sheets; a plurality of light emitting diode chips directly or indirectly disposed on a top surface of the elevation support platform and electrically connected to the plurality of light source electrode sheets, and each one of the light emitting diode chips having a florescent powder gel covered thereon and secured onto the top surface of the elevation support platform; an image-capturing module having an image sensor and a lens set located on top of the image sensor, and a bottom portion of the image sensor having a plurality of contacts connected to the plurality of top electrode sheets; the image-capturing module having a column shape and located within the main element zone, and the image-capturing module arranged spaced apart from the elevation support platform by a predefined distance; a top end of the lens set arranged to be higher than a top end of the plurality of light emitting diode chips; and a fixation glue cured and attached onto the image-capturing module and the elevation support platform and covering a fluorescent powder gel on top of each of the light emitting diode chips; the fixation glue configured to secure a spatial relationship among the image-capturing module, the elevation support platform and the plurality of light emitting diode chips.

According to the aforementioned structure, the present invention utilizes the fixation glue to integrate the circuit, the light source and the image-capturing module into a module. Furthermore, in the present invention, the plurality of light emitting diode chips are elevated from the lower plate such that they are closer to the top end of the image-capturing module while also allowing the plurality of light emitting diode chips to be electrically connected to the bottom electrode sheets at the bottom portion of the circuit board, thereby facilitating the assembly and connection with other elements.

DETAILED DESCRIPTION OF THE INVENTION

To illustrate the technical features of the present invention in detail, exemplary preferred embodiments of the present invention are described below in conjunction with the accompanied drawings.

As shown in FIG. 1 to FIG. 5, according to a preferred embodiment of the present invention, a modular assembly 10 of an endoscope light source and image-capturing module mainly comprises a circuit board 11, a plurality of light emitting diode chips 21, an image-capturing module 31 and a fixation glue 41.

A circuit board 11 includes a lower plate 12 and an elevation support platform 14. A bottom surface of the lower plate 12 includes a plurality of bottom electrode sheets 121 disposed thereon, and a top surface of the lower plate 12 includes a main element zone 12A and a platform zone 12B not overlapping with each other. The elevation support platform 14 is located on the top surface of the lower plate 12 and within the platform zone 12B and has a predefined height. The top surface of the lower plate 12 includes a plurality of top electrode sheets 22 disposed thereon and is located within the main element zone 12A. The plurality of top electrode sheets 122 are electrically connected to the plurality of bottom electrode sheets 121. A top end of the elevation support platform 14 includes a plurality of light source electrode sheets 141 disposed thereon; the plurality of light source electrode sheets 141 use a plurality of lead wires 149 to penetrate through the elevation support platform 14 and the lower plate 12 in order to be electrically connected to the plurality of bottom electrode sheets 121. In this embodiment, the lower plate 12 is a rigid circuit board without flexibility.

Figure 1:
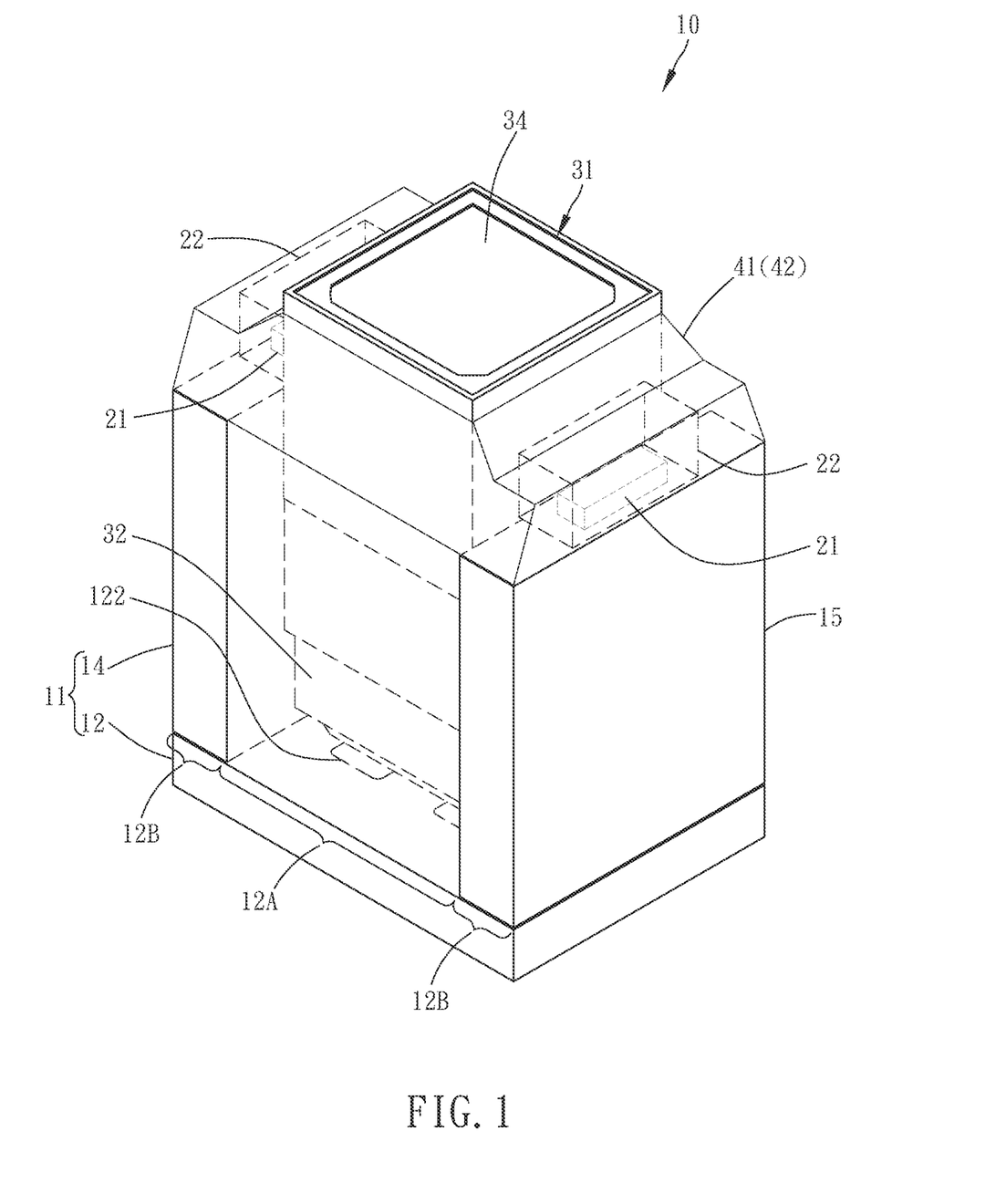
FIG. 1 is an assembly perspective view of a first preferred embodiment of the present invention, wherein the fixation glue and the fluorescent powder gel are shown in transparent state.
Figure 3:
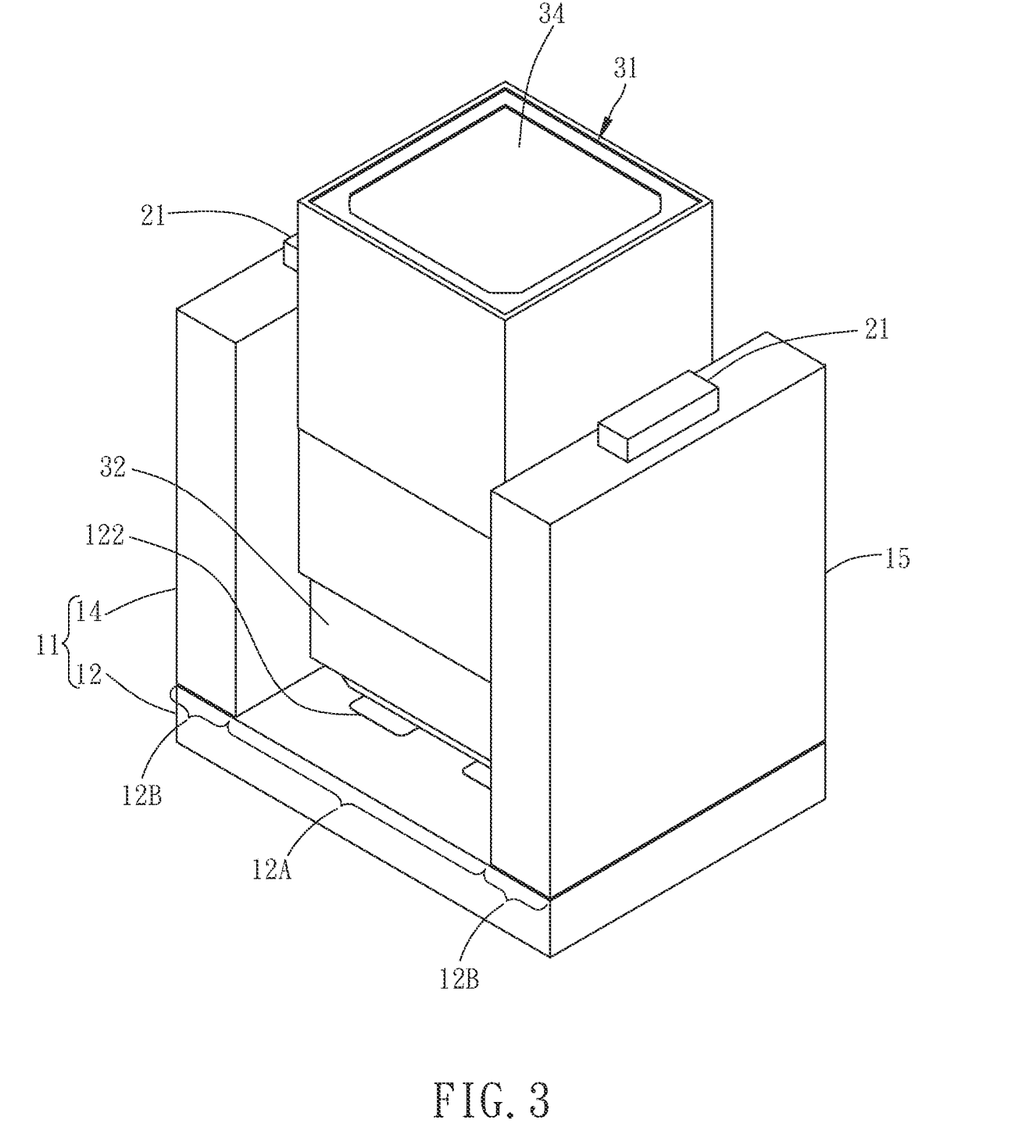
FIG. 3 is a partial element perspective view of the first preferred embodiment of the present invention, illustrating the state after the fixation glue and the fluorescent power are removed.
Figure 4:
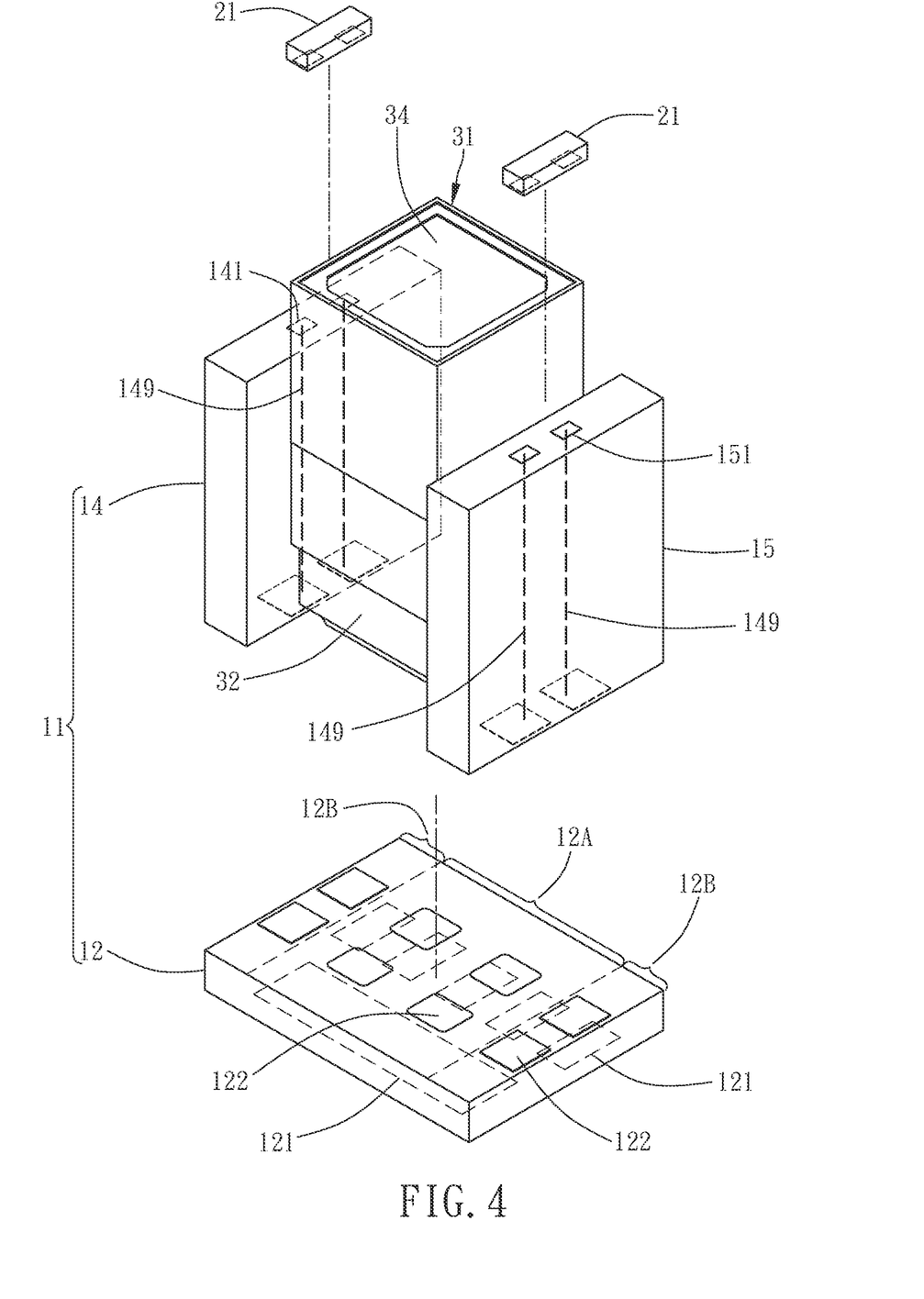
FIG. 4 is an exploded view of FIG. 3.

According to the first embodiment of the present invention, the platform zone 12B is located at one side of the main element zone, 12A, and another side opposite from the main element zone 12A further comprises another platform zone 12B. Another elevation support platform 15 is disposed inside the another platform zone 12B. A top end of the another elevation support platform 15 includes a plurality of light source electrode sheets 151 disposed thereon. The plurality of light source electrode sheets 151 use a plurality of lead wires 149 to penetrate through the another elevation support platform 15 and the lower plate 12 in order to be electrically connected to the plurality of bottom electrode sheets 121. During the actual implementation, the elevation support platform 14 or the another elevation support platform 15 can use one layer or a plurality of layers of rigid circuit boards stacked onto each other according to its thickness in order to construct a vertical structure electrically connected to each other depending upon the needs, thereby achieving the actual implementation structure having a plurality of lead wires 149 penetrating through the elevation support platform 14. In addition, since the lower plate 12 is a rigid circuit board, its internal lead wires can also form electrodes at the top surface and bottom surface electrically connected to each other, which is a known technique. Accordingly, the lead wires of the lower plate 12 in the present invention are not further illustrated in the drawings for the purpose of concise presentation without complicated wiring patterns.

Furthermore, in practice, the lower plate 12, the elevation support platform 14 and the another elevation support platform 15 can be an integrally formed ceramic substrate, or can be an integrally formed three-dimensional circuit board, or can be formed by a plurality of rigid circuit boards stacked onto each other, wherein the electrode plates among the circuit boards can be attached to each other via the surface mounting technique or soldering technique. In other words, the attachment technique utilized to attach the lower plate 12, the elevation support platform 14 and the another elevation support platform 15 can be either a combination of elements or an integrally formed structure.

The plurality of light emitting diode chips 21 are directly or indirectly disposed on a top surface of the elevation support platform 14 and electrically connected to the plurality of light source electrode sheets 141, In addition, each one of the light emitting diode chips 21 includes a florescent powder gel 22 covered thereon and secured onto the top surface of the elevation support platform 14. Furthermore, the plurality of light emitting diodes 21 are also disposed on a top end of another elevation support platform 15 and are electrically connected to the plurality of light source electrode sheets 151 on the another elevation support platform 15.

The image-capturing module 31 includes an image sensor 32 and a lens set 34 located on top of the image sensor 32, and a bottom portion of the image sensor 32 includes a plurality of contacts 321 connected to the plurality of top electrode sheets 122. In practice, the method of welding can be used for the connection. The image-capturing module 31 has a column shape and is located within the main element zone 12A, and the image-capturing module 31 is arranged spaced apart from the elevation support platform 14 by a predefined distance. A top end of the lens set 34 is arranged to be higher than a top end of the plurality of light emitting diode chips 21. During the actual implementation, the top surface of the plurality of light emitting diode chips 21 is higher than one half of the height of the image-capturing module 31, and it is preferably higher than two thirds of the height of the image-capturing module 31, such that it is optimal to be closer to the top end of the image-capturing module 31.

Figure 2:
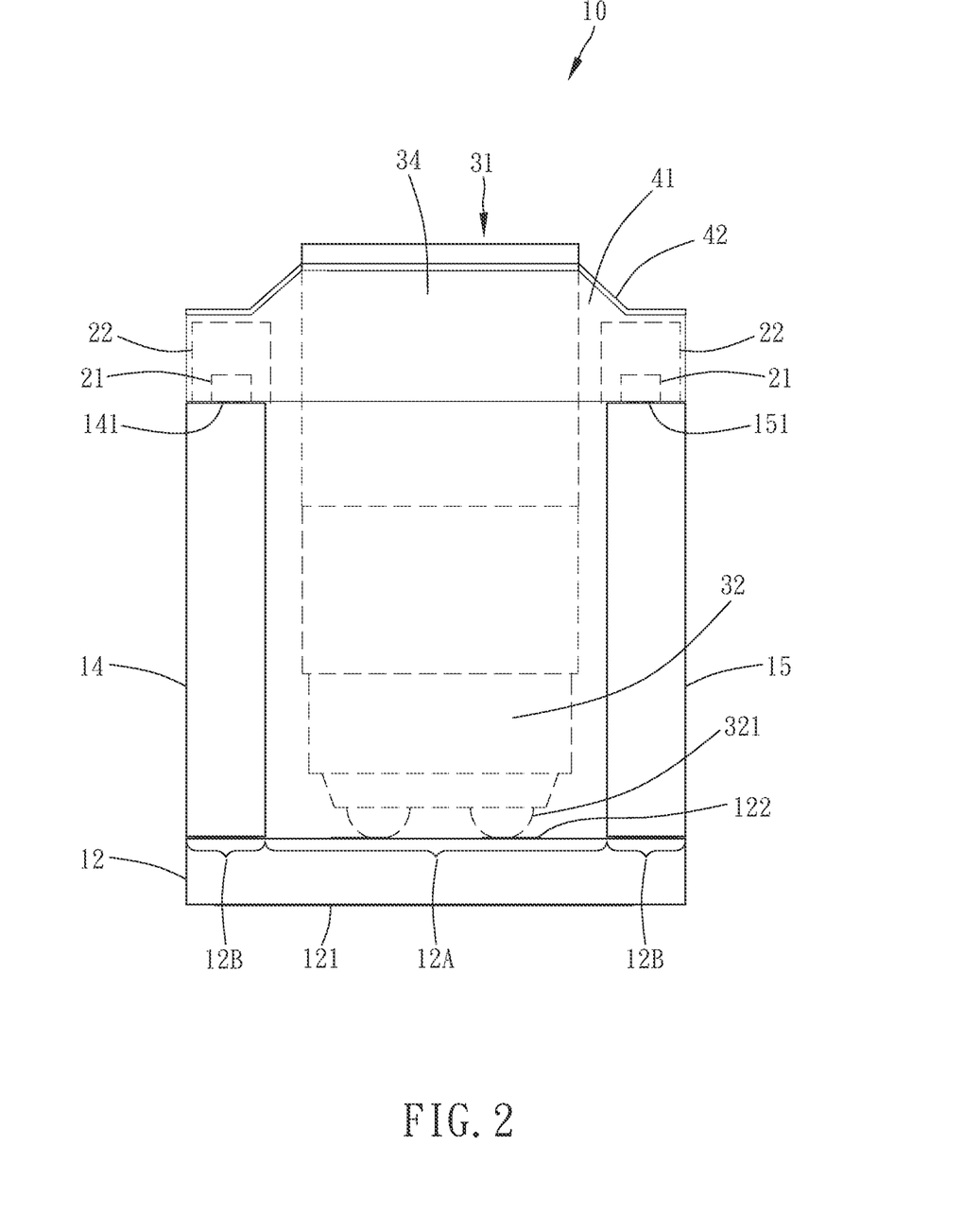
FIG. 2 is a front view of the first preferred embodiment of the present invention.

The fixation glue 41 is cured and attached onto the image-capturing module 31 and the elevation support platform 14 and covers a fluorescent powder gel 22 on top of each of the light emitting diode chips 21. The fixation glue 41 is configured to secure a spatial relationship among the image-capturing module 31, the elevation support platform 14 and the plurality of light emitting diode chips 21. The fixation glue 41 can be transparent, or it can also be non-completely transparent material but light transmissive.

As shown in FIG. 2, the top surface of the fixation glue 41 can be further disposed of a transparent protective layer 42 depending upon the needs, and its material can use a known resin material as the transparent protective layer 42, such that it is able to achieve the additional protection effect for the fixation glue 41. However, if the entirety of the present invention is installed inside the metal tube at the top end of the endoscope and there are other protective mechanisms, then it is not necessary to provide the transparent protective layer 42. In other words, the scope of the claims of the present invention shall not limited by the element of transparent protective layer 42. In FIG. 1, the structure of the transparent protective layer 42 is not shown but is shown together with the symbol number of 42 and the fixation glue 41 only for the purpose of concise presentation without complicated patterns.

Figure 5:
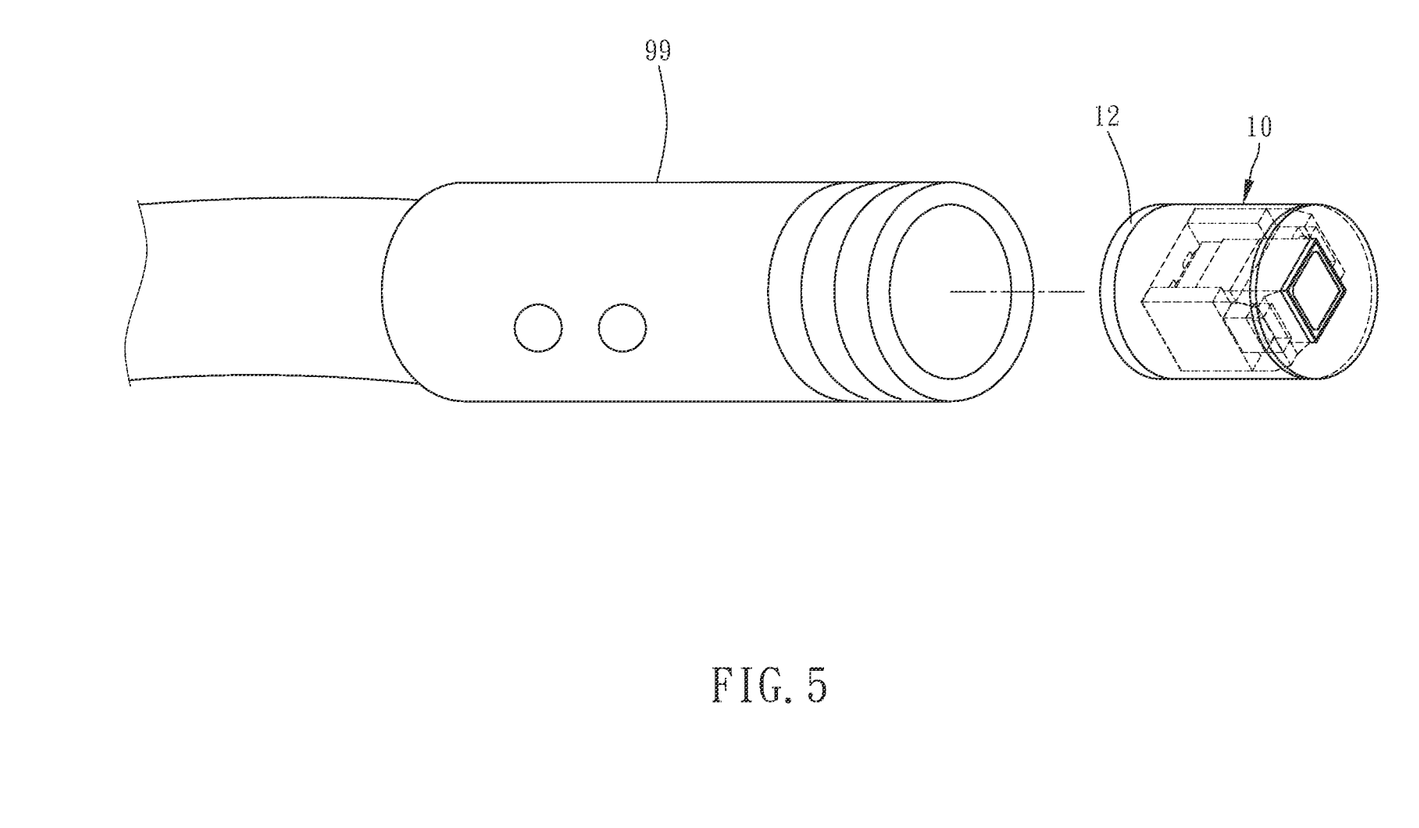
FIG. 5 is an assembly view of the first preferred embodiment of the present invention.

The above describes the structure of the first embodiment of the present invention. However, during the actual installation, since the fixation glue 41 secures the spatial relationship among the image-capturing module 31, the elevation support platform 14 and the plurality of light emitting diode chips 21, the entirety forms a modular component. Accordingly, as shown in FIG. 5, it can be conveniently installed inside the metal tube 99 at the top end of the endoscope, and it can also be used as one single component with the utilization of the plurality of bottom electrode sheets 121 at the bottom surface of the lower plate 12 to achieve electrical connection with other components (such as an endoscope main unit or operating handle) via the circuit (not shown in the drawing). In addition, for the purpose of concise presentation, the lower plate 12 in FIG. 5 is shown to have a circular shape in order to allow the entirety to match with the actual installation state. Furthermore, the present invention also achieves the outcome of elevating the light source (i.e., the plurality of light emitting diode chips 21) from the circuit board in order to be closer to the top end of the image-capturing module 31 while maintaining the electrical connection with the plurality of bottom electrode sheets 121 at the bottom surface of the circuit board 11, in order to be further connected to other components for control thereof.

Figure 6:
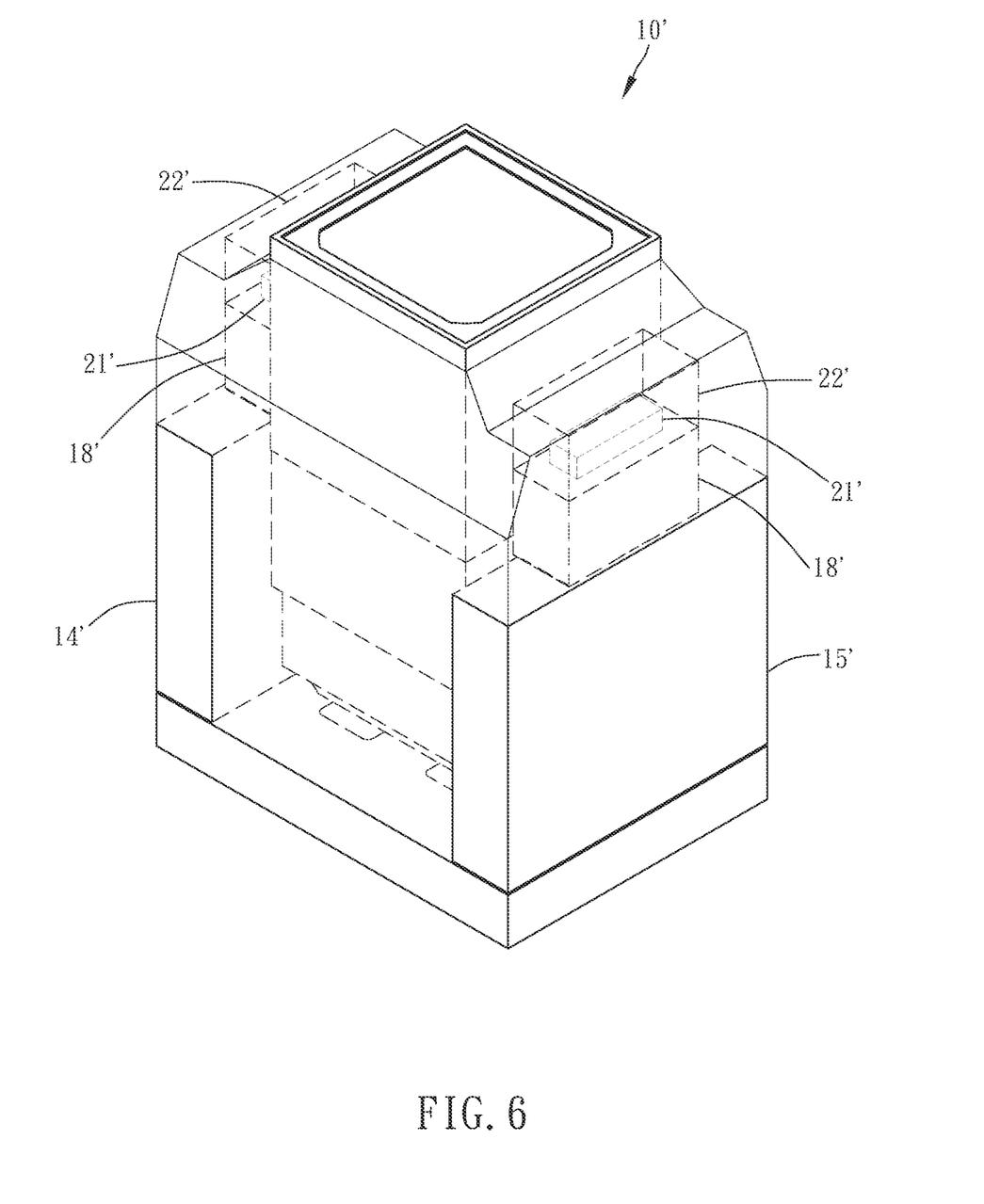
FIG. 6 is an assembly perspective view of a second preferred embodiment of the present invention, wherein the fixation glue and the fluorescent powder gel are shown in transparent state.
Figure 7:
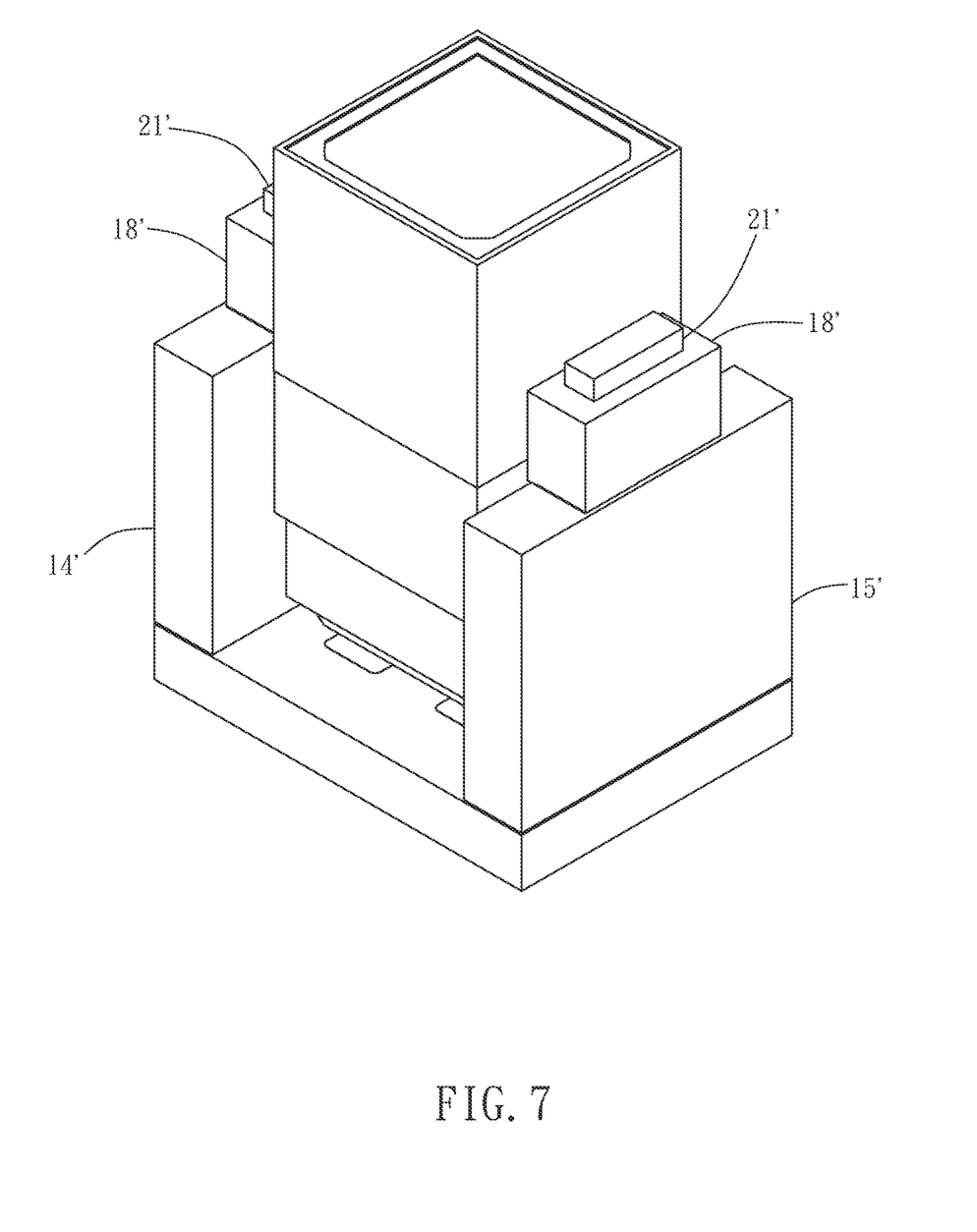
FIG. 7 is a partial element perspective view of the second preferred embodiment of the present invention, illustrating the state after the fixation glue and the fluorescent power are removed.
Figure 8:
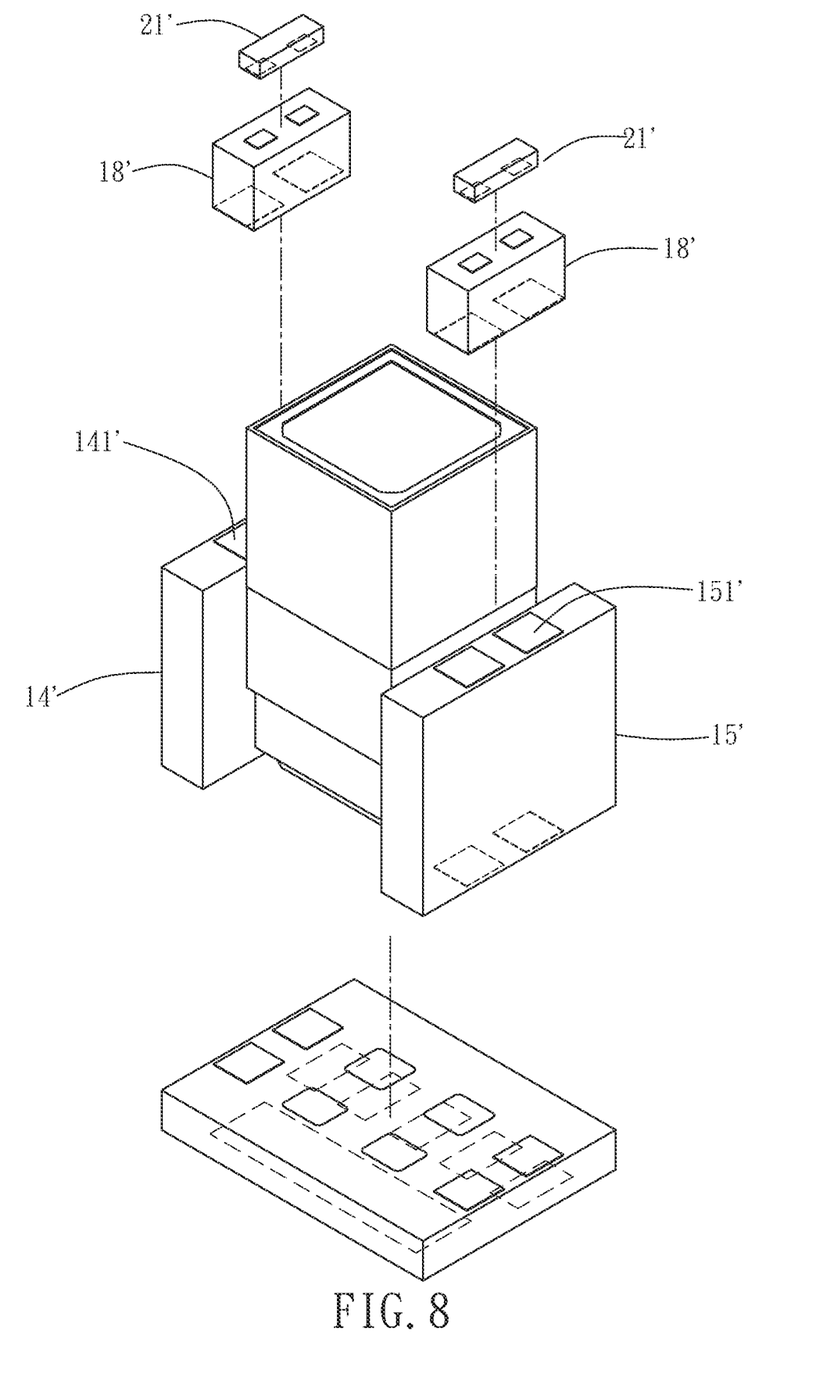
FIG. 8 is an exploded view of FIG. 7.

As shown in FIG. 6 to FIG. 8, according to a second embodiment of the present invention, a modular assembly 10' of an endoscope light source and image-capturing module is provided, which is generally identical to the aforementioned first embodiment, and the difference between the two mainly relies in:

In the second embodiment of the present invention, it further comprises two light emitting diode substrates 18- and ceramic substrates can be selected for use during the actual implementation. The plurality of light emitting diode chips 21' are disposed on the two light emitting diode substrates 18'. The two light emitting diode substrates are respectively arranged on the top surfaces of the elevation support platform 14' and the another elevation support platform 15' and are electrically connected to the plurality of light source electrode sheets 141', 151'. The plurality of light emitting diode chips 21' are further electrically connected to the plurality of light source electrode sheets 141', 151'. Each one of the fluorescent gels 22' covering each one of the light emitting diode chips 21' is secured onto a top surface of each one of the light emitting diode substrates 18', such that each one of the light emitting diode chips 21' is indirectly arranged on the top surfaces of the elevation support platform 14' and the another elevation support platform 15'.

The two light emitting diode substrates 18' used in this second embodiment achieves the effect of additional elevation of the plurality of light emitting diode chips 21'. In addition, the ceramic substrates used are able to allow the plurality of light emitting diode chips 21' to be disposed on the two light emitting diode substrates 18' during the manufacturing with the use of the Chip Scale Package (CSP) process. In addition, each one of the fluorescent powder gels 22' can be covered properly in advance in order to facilitate the operation process during the assembly of the elevation support platform 14'.

The rest of the structure and achievable technical effects of the second embodiment are generally identical to those of the first embodiment; accordingly, details thereof are omitted hereafter.

Figure 9:
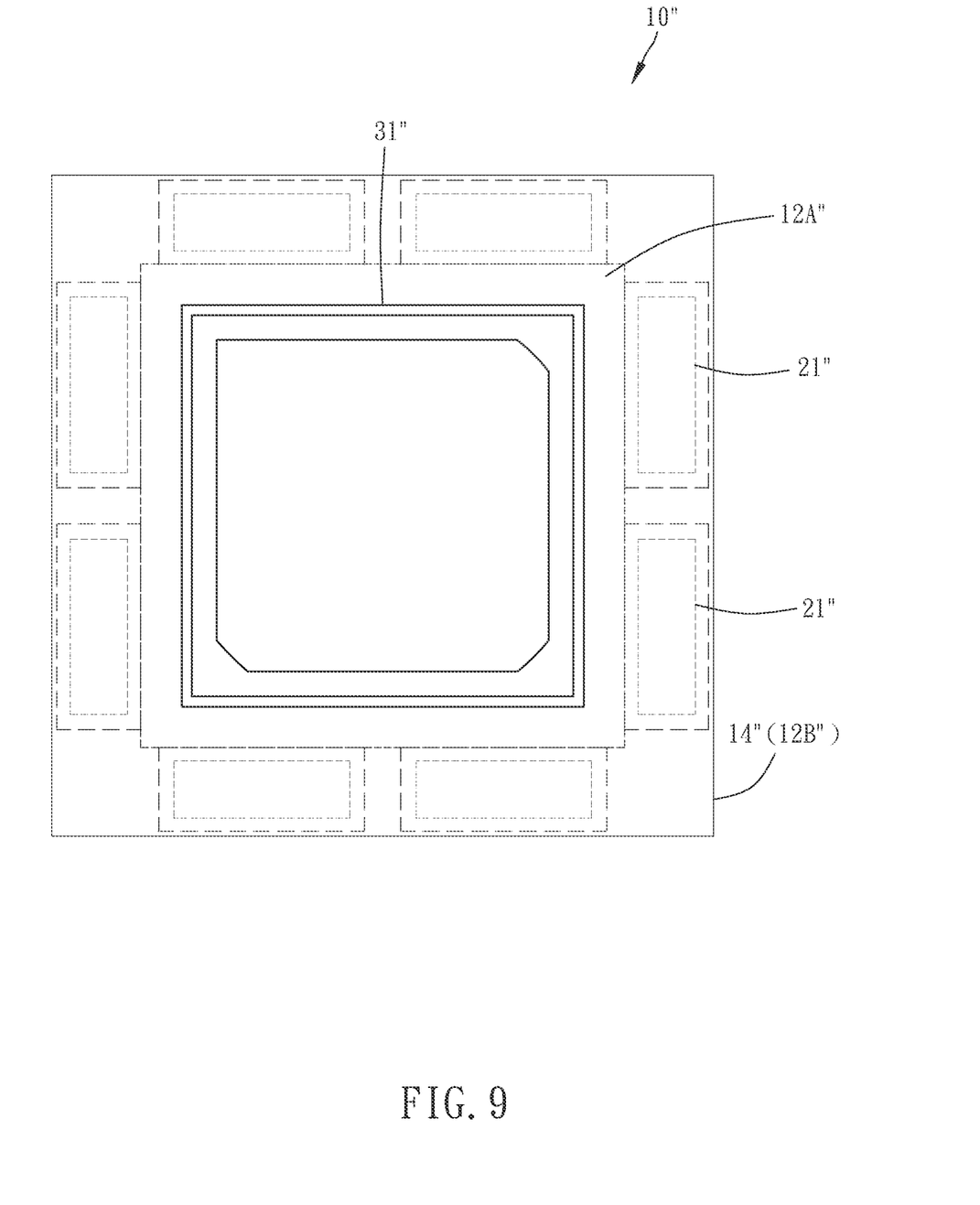
FIG. 9 is a top view of a third preferred embodiment of the present invention.

As shown in FIG. 9, according to a third embodiment of the present invention, a modular assembly 10" of an endoscope light source and image-capturing module is provided, which is generally identical to the aforementioned second embodiment, and the difference between the two mainly relies in:

In this embodiment, there is only one elevation support platform 14", and it does not include the aforementioned another elevation support platform. In addition, the elevation support platform 14" is a hollow column surrounding the outer side of the main element zone 12A"; in other words, it also surrounds the circumference of the image-capturing module 31". Furthermore, the platform zone 12B" is equivalent to the zone covered by the elevation support platform 14", such that it also surrounds the outer side of the main element zone 12A".

In this third embodiment, the configuration of the elevation support platform 14" is different from the aforementioned two embodiments, and its surrounding method can be arranged to facilitate the surrounding method of the plurality of light emitting diode chis 21", thereby allowing the light source to be more uniform. Furthermore, the top surface of the elevation support platform 14" also has a larger installation surface that can be provided to accommodate greater number of light emitting diode chips 21" in comparison to the aforementioned second embodiment.

The rest of the structure and achievable technical effects of the third embodiment are generally identical to those of the second embodiment; accordingly, details thereof are omitted hereafter.

What is claimed is:

1. A modular assembly of an endoscope light source and an image-capturing module, comprising:
    a circuit board having a lower plate and an elevation support platform, a bottom surface of the lower plate having a plurality of bottom electrode sheets disposed thereon, and a top surface of the lower plate having a main element zone and a platform zone not overlapping with each other, the elevation support platform located on the top surface of the lower plate and within the platform zone and having a predefined height; the top surface of the lower plate having a plurality of top electrode sheets disposed thereon and located within the main element zone; the plurality of top electrode sheets electrically connected to the plurality of bottom electrode sheets, a top end of the elevation support platform having a plurality of light source electrode sheets disposed thereon, the plurality of light source electrode sheets using a plurality of lead wires to penetrate through the elevation support platform and the lower plate in order to be electrically connected to the plurality of bottom electrode sheets;

a plurality of light emitting diode chips directly or indirectly disposed on a top surface of the elevation support platform and electrically connected to the plurality of light source electrode sheets, and each one of the light emitting diode chips having a florescent powder gel covered thereon and secured onto the top surface of the elevation support platform;

an image-capturing module having an image sensor and a lens set located on top of the image sensor, and a bottom portion of the image sensor having a plurality of contacts connected to the plurality of top electrode sheets, the image-capturing module having a column shape and located within the main element zone, and the image-capturing module arranged spaced apart from the elevation support platform by a predefined distance, a top end of the lens set arranged to be higher than a top end of the plurality of light emitting diode chips; and a fixation glue cured and attached onto the image-capturing module and the elevation support platform and covering a fluorescent powder gel on top of each of the light emitting diode chips, the fixation glue configured to secure a spatial relationship among the image-capturing module, the elevation support platform and the plurality of light emitting diode chips.

2. The modular assembly of the endoscope light source and the image-capturing module according to claim 1, wherein the lower plate is a rigid circuit board without flexibility.

3. The modular assembly of the endoscope light source and the image-capturing module according to claim 1, wherein the top surface of the plurality of light emitting diodes is higher than one half of a height of the image-capturing module.

4. The modular assembly of the endoscope light source and the image-capturing module according to claim 1, wherein the top surface of the plurality of light emitting diodes is higher than two thirds of a height of the image-capturing module.

5. The modular assembly of the endoscope light source and the image-capturing module according to claim 1, wherein a top surface of the fixation glue further includes a transparent protective layer.

6. The modular assembly of the endoscope light source and the image-capturing module according to claim 1, wherein the elevation support platform is a hollow column surrounding an outer side of the main element zone.

7. The modular assembly of the endoscope light source and the image-capturing module according to claim 1, wherein the platform zone is located at one side of the main element zone, and another side opposite from the main element zone further comprises another platform zone; another elevation support platform is disposed inside the another platform zone; a top end of the another elevation support platform includes a plurality of light source electrode sheets disposed thereon; the plurality of light source electrode sheets use a plurality of lead wires to penetrate through the another elevation support platform and the lower plate in order to be electrically connected to the plurality of bottom electrode sheets; the plurality of light emitting diode chips are disposed on the top ends of the elevation support platform and the another elevation support platform and are electrically connected to the plurality of light source electrode sheets.

8. The modular assembly of the endoscope light source and the image-capturing module according to claim 1, further comprising a light emitting diode substrate; the plurality of light emitting diode chips are disposed on the light emitting diode substrate; the light emitting diode substrate is arranged on the top surface of the elevation support platform and is electrically connected to the plurality of light source electrode sheets; the plurality of light emitting diode chips are further electrically connected to the plurality of light source electrode sheets; each one of the fluorescent gels covering each one of the light emitting diode chips is secured onto a top surface of the light emitting diode substrate, such that each one of the light emitting diode chips is indirectly arranged on the top surface of the elevation support platform.

9. The modular assembly of the endoscope light source and the image-capturing module according to claim 8, wherein the platform zone is located at one side of the main element zone, and another side opposite from the main element zone further comprises another platform zone; another elevation support platform is disposed inside the another platform zone; a top end of the another elevation support platform includes a plurality of light source electrode sheets disposed thereon; the plurality of light source electrode sheets use a plurality of lead wires to penetrate through the another elevation support platform and the lower plate in order to be electrically connected to the plurality of bottom electrode sheets; the plurality of light emitting diode substrates are disposed on the top ends of the elevation support platform and the another elevation support platform and are electrically connected to the plurality of light source electrode sheets.

* * * * *